(12) United States Patent
Nezu

(10) Patent No.: US 11,598,462 B2
(45) Date of Patent: Mar. 7, 2023

(54) LOCKING MECHANISM FOR TUBULAR BODY

(71) Applicant: NIFCO INC., Yokosuka (JP)

(72) Inventor: Mikio Nezu, Yokosuka (JP)

(73) Assignee: NIFCO INC., Yokosuka (JP)

( * ) Notice: Subject to any disclaimer, the term of this patent is extended or adjusted under 35 U.S.C. 154(b) by 1105 days.

(21) Appl. No.: 16/302,983

(22) PCT Filed: Apr. 26, 2017

(86) PCT No.: PCT/JP2017/016572
§ 371 (c)(1),
(2) Date: Nov. 19, 2018

(87) PCT Pub. No.: WO2017/199718
PCT Pub. Date: Nov. 23, 2017

(65) Prior Publication Data
US 2019/0293102 A1    Sep. 26, 2019

(30) Foreign Application Priority Data
May 20, 2016    (JP) .............................. JP2016-101191

(51) Int. Cl.
*F16B 7/04* (2006.01)
*F16L 37/088* (2006.01)
(Continued)

(52) U.S. Cl.
CPC ............ *F16L 37/0885* (2019.08); *F16B 7/04* (2013.01); *F16L 37/088* (2013.01);
(Continued)

(58) Field of Classification Search
CPC . F16L 37/0885; F16L 37/0841; F16L 37/098; F16L 37/133; F16L 37/14; F16L 37/144; F16L 37/1225; F16B 7/04
(Continued)

(56) References Cited

U.S. PATENT DOCUMENTS 3,922,011 A    11/1975 Walters
5,211,427 A    5/1993 Washizu
(Continued)

FOREIGN PATENT DOCUMENTS

EP    1749167 A1    2/2007
JP    H04-224393 A    8/1992
(Continued)

OTHER PUBLICATIONS

PCT/ISA/210, "International Search Report for International Application No. PCT/JP2017/016572," dated Jul. 18, 2017.
(Continued)

*Primary Examiner* — Zachary T Dragicevich
*Assistant Examiner* — William S. Choi
(74) *Attorney, Agent, or Firm* — Manabu Kanesaka

(57) ABSTRACT

A locking member is mounted to the housing to be able to move in the outer diameter direction by a tapered portion of the tubular body, when the tubular body is inserted. The housing is equipped with slits formed to pass a curved portion bent in the inner diameter direction disposed at a leading-end side of the locking member and to lock with the engagement portion of the tubular body mounted on the housing. A gap is disposed between the curved portion, and the end portion of the slit positioned at a side in an opposite direction to the leading-end side of the locking member, so that there is no contact while at least the locking member is moving.

7 Claims, 18 Drawing Sheets

(51) Int. Cl.
*F16L 37/084* (2006.01)
*F16L 37/098* (2006.01)
*F16L 37/133* (2006.01)
*F16L 37/14* (2006.01)

(52) U.S. Cl.
CPC ......... *F16L 37/0841* (2013.01); *F16L 37/098* (2013.01); *F16L 37/133* (2013.01); *F16L 37/144* (2013.01)

(58) Field of Classification Search
USPC .................. 285/305, 317, 319, 321; 403/257
See application file for complete search history.

(56) References Cited

U.S. PATENT DOCUMENTS

| | | | |
|---|---|---|---|
| 7,530,605 B2 * | 5/2009 | Rigollet | F16L 37/144 285/305 |
| 7,571,939 B2 * | 8/2009 | Yoshida | F16L 37/0885 285/317 |
| 2003/0052484 A1 * | 3/2003 | Rautureau | F16L 37/0885 285/319 |
| 2006/0022460 A1 | 2/2006 | Callahan | |
| 2007/0026703 A1 | 2/2007 | Taga et al. | |
| 2008/0252070 A1 | 10/2008 | Hartmann | |
| 2010/0140923 A1 | 6/2010 | Hellfeier et al. | |
| 2012/0056420 A1 | 3/2012 | Fansler | |
| 2013/0140808 A1 * | 6/2013 | Bongiorni | F16L 37/0885 |
| 2013/0220467 A1 * | 8/2013 | Ristovski | F16L 37/144 |
| 2015/0354736 A1 * | 12/2015 | Krupa | F16L 37/0885 285/321 |

FOREIGN PATENT DOCUMENTS

| | | |
|---|---|---|
| JP | 2004-211891 A | 7/2004 |
| JP | 2007-032673 A | 2/2007 |
| JP | 2007-508496 A | 4/2007 |
| JP | 2010-532455 A | 10/2010 |
| JP | 2013-534993 A | 9/2013 |
| KR | 20150054032 A * | 11/2013 |

OTHER PUBLICATIONS

Europe Patent Office, "Search Report for European Patent Application No. 17799148.6," dated Oct. 18, 2019.

* cited by examiner

LOCKING MECHANISM FOR TUBULAR BODY

TECHNICAL FIELD

The present invention relates to a locking mechanism for tubular body.

BACKGROUND ART

Conventionally, a pipe connector is known that is capable of pipe insertion or release by a wire pulling upward, and the wire moving in an outer diameter direction, when inserting a pipe, or when releasing a pipe. Specifically, the wire includes a curved portion that passes through a slit in the connector to project inside a connector.

SUMMARY OF THE INVENTION

Problems to be Solved by the Invention

However, there is a problem in the conventional connector described above, in that the curved portion of the wire hits an edge of the slit when locking or unlocking the pipe, and slidingly moves while touching the edge, so that an operating force required for locking or unlocking a plug becomes higher because of frictional resistance or the like, thereby making operation difficult.

Therefore, in light of the problem associated with the conventional technology, an object of the present invention is to improve operability when connecting the tubular body, by reducing the operating force when inserting a tubular body such as a pipe or the like.

Means for Solving the Problem

In order to attain the object of the present invention described above, a locking mechanism for the tubular body according to a first aspect of the present invention features the following points.

Firstly, the locking mechanism for the tubular body is composed of the following constitution.

(1) Housing

The housing is a tubular item to which at least one end of a tubular body equipped with an engagement portion is mounted.

(2) Locking Member

The locking member locks and unlocks the housing and tubular body.

Secondly, the locking member is mounted to the housing to be able to move in the outer diameter direction by a tapered portion of the tubular body, when the tubular body is inserted.

Thirdly, the housing is equipped with a slit where a curved portion bent in an inner diameter direction, disposed at a leading-end side of the locking member passes therethrough and to lock with the engagement portion of the tubular body, mounted on the housing.

Fourthly, a gap is disposed between the curved portion, and the end portion of the slit positioned at a side in an opposite direction to the leading-end side of the locking member, so that there is no contact while at least the locking member is moving.

Fifthly, the guide unit is disposed at the leading-end side of the locking member more than the end portion of the slit.

Sixthly, a gap (64) is disposed between the curved portion and the end portion of the slit positioned at a side in an opposite direction to the leading-end side of the locking member, so that there is no contact while at least the locking member is moving.

With the second aspect, it is acceptable to use an oblique sliding surface for the guide unit that extends from an outer surface of the housing to an outer side in a diameter direction to enable a leading-end portion of the locking member to slide, when the locking member moves in the outer diameter direction to the housing, or when it moves from a position after moving to the outer diameter direction to the inner diameter. In such a case, it is possible to widen the leading-end side of the locking member at the oblique sliding surface when the locking member such as a wire or the like moves in the outer diameter direction, so operability is good. Also, when it moves in the inner diameter direction, it is possible to guide the locking member to a locking position.

In the second aspect, it is acceptable to configure so that the oblique sliding surface touches the leading-end portion partway during movement when the locking member moves in the outer diameter direction to the housing. In such a case, upon disposing a run-up portion up to where the locking member such as a wire or the like touches the oblique sliding surface, it is possible to lighten the movement when the locking member starts to move, and to improve operability when inserting or releasing the tubular body of a pipe or the like. More specifically, when the leading-end portion of the locking member touches the oblique sliding surface when the locking member starts to move, the operating force that bends the locking member in the outer diameter direction gradually increases. In contrast, when the leading-end portion of the locking member touches the run-up portion, there is an advantage that it is possible to improve operability because there is no increase in operating force when it starts to move.

In the second aspect, it is acceptable to form such that the locking member is held, after moving, by a holding portion disposed at the oblique sliding surface. In this case, it is possible to fasten the locking member at the holding position, in other words, the release position, with a simple constitution.

In the first and the second aspects of the present invention, the curved portions are composed of a first curved portion and a second curved portion disposed at opposing positions, and a third curved portion may be disposed between the first curved portion and the second curved portion. In such a case, it is possible to hold the tubular body of a pipe or the like at the three points of the first curved portion, the second curved portion, and the third curved portion, and solidly to hold it.

Effect of the Invention

According to the present invention, by disposing a gap between the locking member such as a wire or the like and the slit in the housing, it is possible to improve operability when connecting the tubular body by reducing operating force when inserting the tubular body such as a pipe or the like.

Furthermore, according to the second aspect of the present invention, by disposing the guide unit that moves the locking member in the outer diameter direction at the leading-end side of the locking member of a wire or the like more than the end of the slit, it is possible to relatively open the leading-end portion of the locking member, and reduce the operating force when releasing the lock thereby improving operability when releasing the connection of the tubular body. In other words, when opening the leading-end side of the locking member, it is possible to reduce the operating force more than when opening partway in the length of the locking member.

BRIEF DESCRIPTION OF THE DRAWINGS

FIGS. 17(a)-17(c) are explanatory views for describing a locked state of a leading-end portion of the locking member and a guide unit, wherein FIG. 17(a) shows a locked state of the locking member; FIG. 17(b) shows a state leading to the lock-released state; and FIG. 17(c) is the lock-released state; and FIGS. 18(a)-18(c) are explanatory views for describing a locked state of the leading-end portion of the locking member and the guide unit, corresponding to FIGS. 17(a)-17(c), wherein FIG. 18(a) shows the lock-released state of the locking member; FIG. 18(b) shows a state leading to the locked state; and FIG. 18(c) is the locked state.

DESCRIPTION OF THE PREFERRED EMBODIMENTS

The locking mechanism according to a first embodiment will now be described with reference to the FIGS. 1 to 18(c).

(Locking Mechanism 10)

Figure 1:
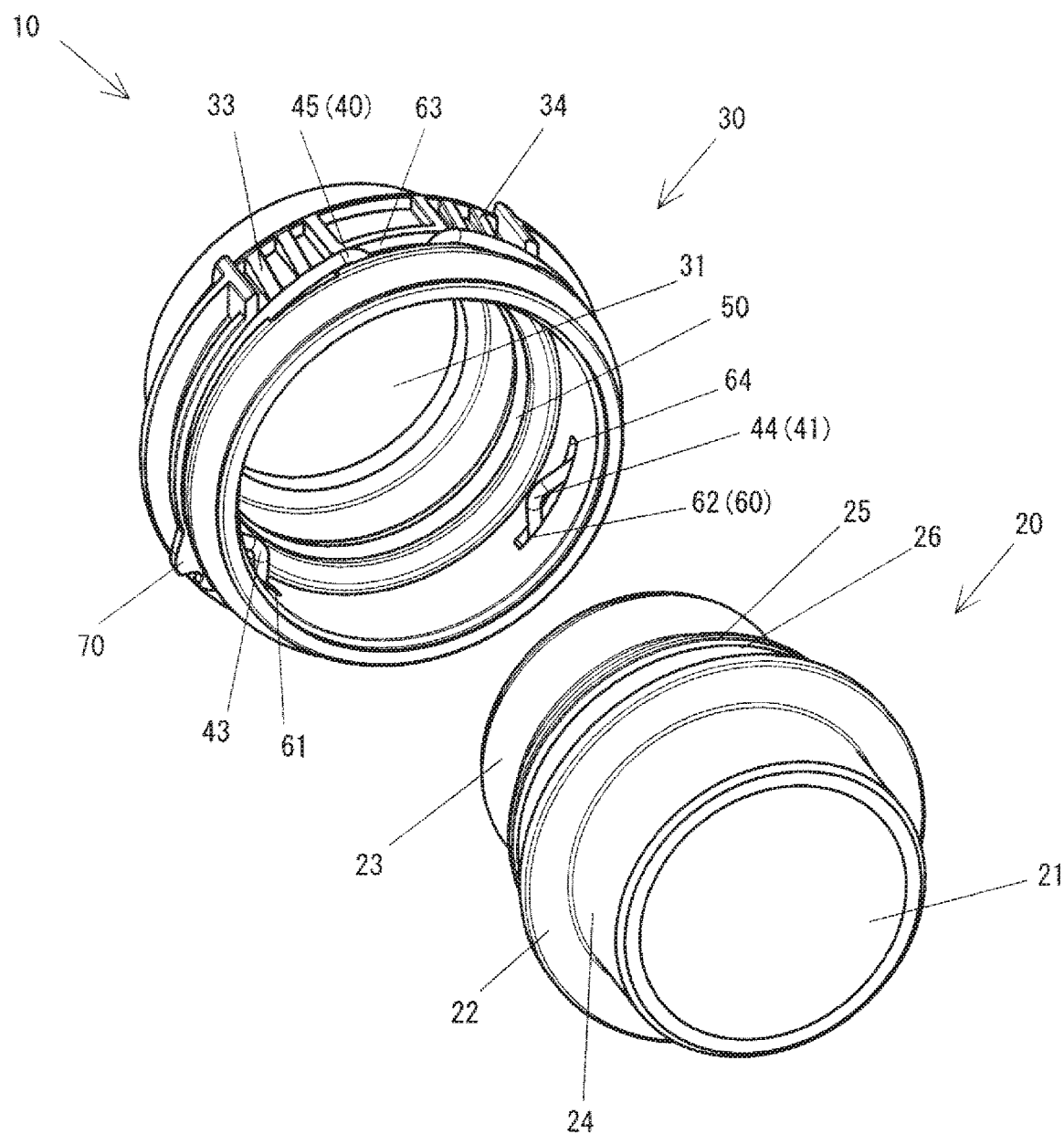
FIG. 1 is an exploded, perspective view of a locking mechanism according to a first embodiment of the present invention.

In FIG. 1, symbol 10 denotes a locking mechanism for a tubular body 20. The locking mechanism 10, for example, can be used as a connector for turbo ducts or for intercooler pipes in an automobile.

Furthermore, the turbo ducts or for intercooler pipes in an automobile, are used to exemplify uses of the locking mechanism 10, but the mechanism is not limited thereto; it can be used not only for a water system in a radiator or the like, but also it is not limited to use in automobiles. It can be used for trains, ships, aircraft, housing equipment, agricultural irrigation, and other industrial applications.

Figure 2:
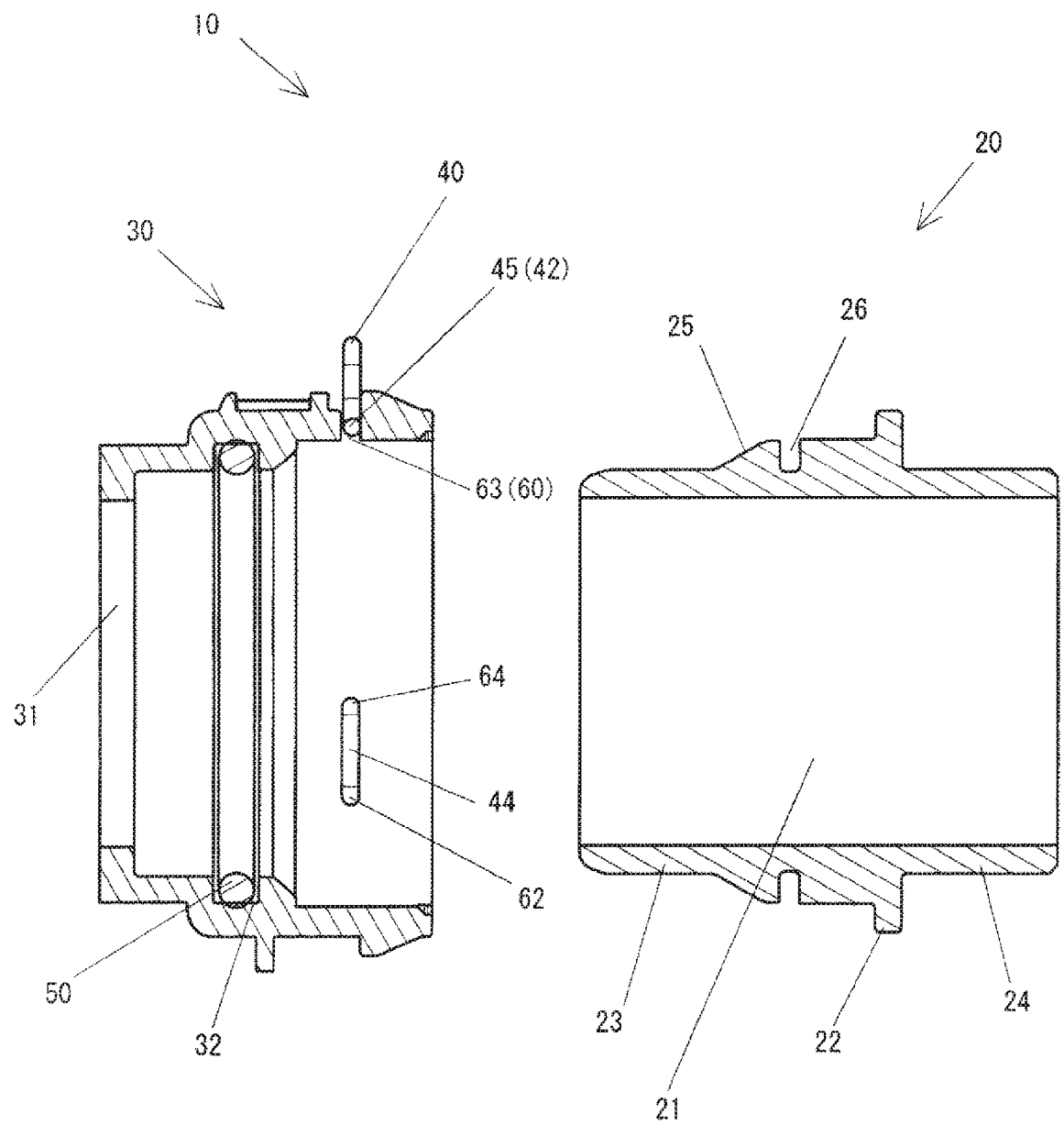
FIG. 2 is an exploded sectional view of the locking mechanism.

Broadly, the locking mechanism 10 is equipped with the following parts, as depicted in FIGS. 1, and 2.

Also, the following items of (1) to (4) will be described below.

(1) Tubular body 20
(2) Housing 30
(3) Locking member 40
(4) O-ring 50

Also, the parts of the locking mechanism 10 are not limited to items (1) to (4) above. For example, it is acceptable to omit (4) O-ring 50.

(Tubular Body 20)

As shown in FIGS. 1, and 2, the tubular body 20 is formed into a tubular shape, or a pipe shape. The tubular body 20 is integrally formed by a thermoplastic synthetic resin, for example, having rigidity.

The tubular body 20 includes a hollow portion 21 that penetrates left and right, in FIG. 2, and includes a flange portion 22 that overhangs in a ring shape at an outer diameter direction. The tubular body 20 comprises an insertion portion 23 that can be inserted into an opening 31, described below, in the housing 30, and is positioned at a left side when looking at the drawing, and opposite the housing 30, and a connecting portion 24 for connecting a pipe or the like, not shown, positioned at an opposite side, specifically, positioned at a right side when looking at the drawing, sandwiching the flange 22.

Broadly, the insertion portion 23 comprises the following parts, as shown in FIG. 2.

Also, the following items of (1) and (2) will be described below.

(1) Tapered portion 25
(2) Engagement portion 26

Also, the insertion portion 23 is not limited to items (1) and (2) above.

(Tapered Portion 25)

As shown in FIG. 2, and FIGS. 8 to 11, when the insertion portion 23 is inserted into the opening 31 described below, the tapered portion 25 touches the locking member 40 in the opening 31, and moves the locking member 40 in the outer diameter direction relative to the housing 30; in other words, it expands its diameter. Partway in a length direction of the insertion portion 23, the tapered portion 25 rises to a frustoconical shape, gradually increasing the outer diameter toward the flange portion 22.

(Engagement Portion 26)

Figure 7:
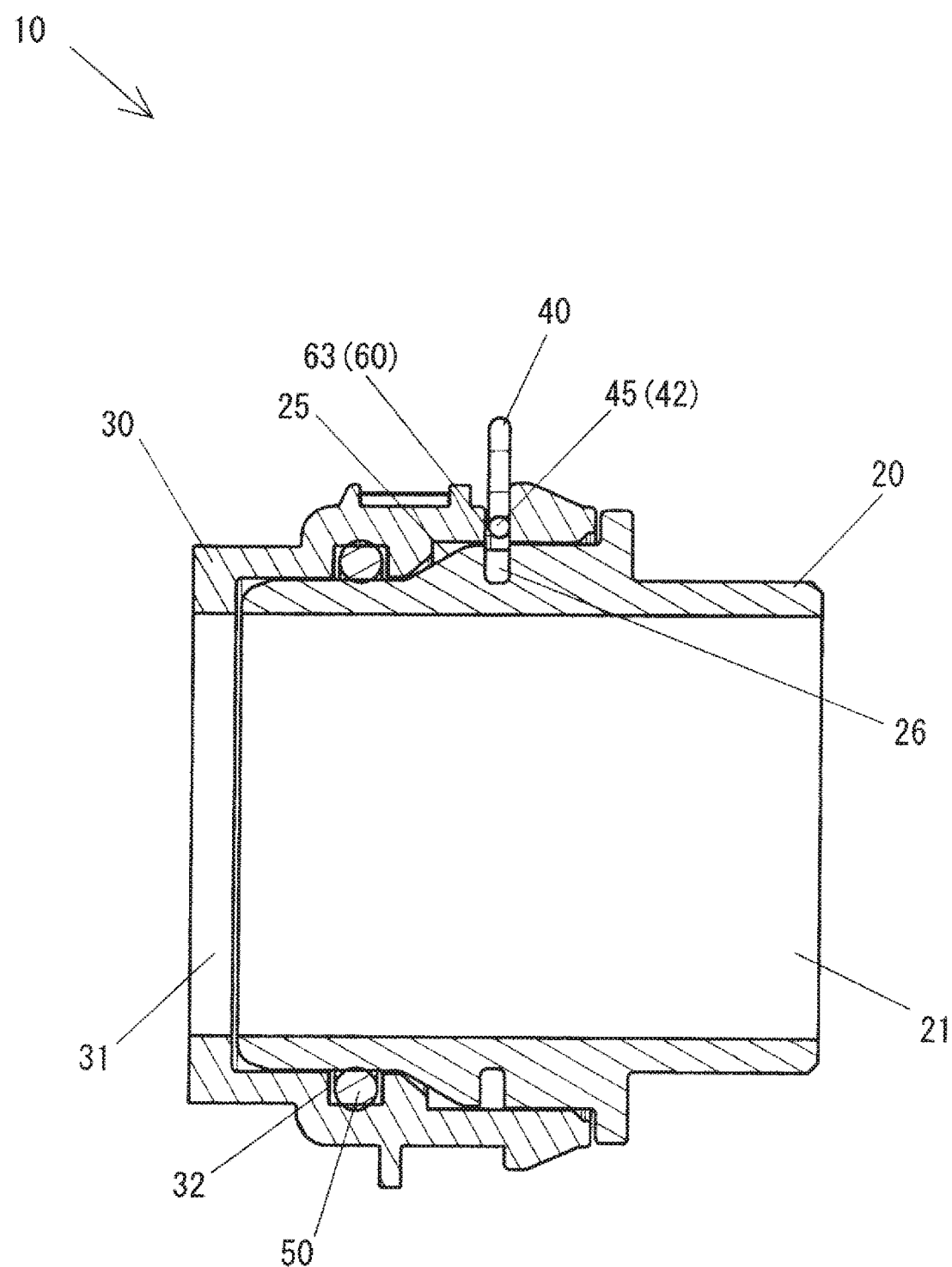
FIG. 7 is a sectional view along line A-A in FIG. 5.
Figure 16:
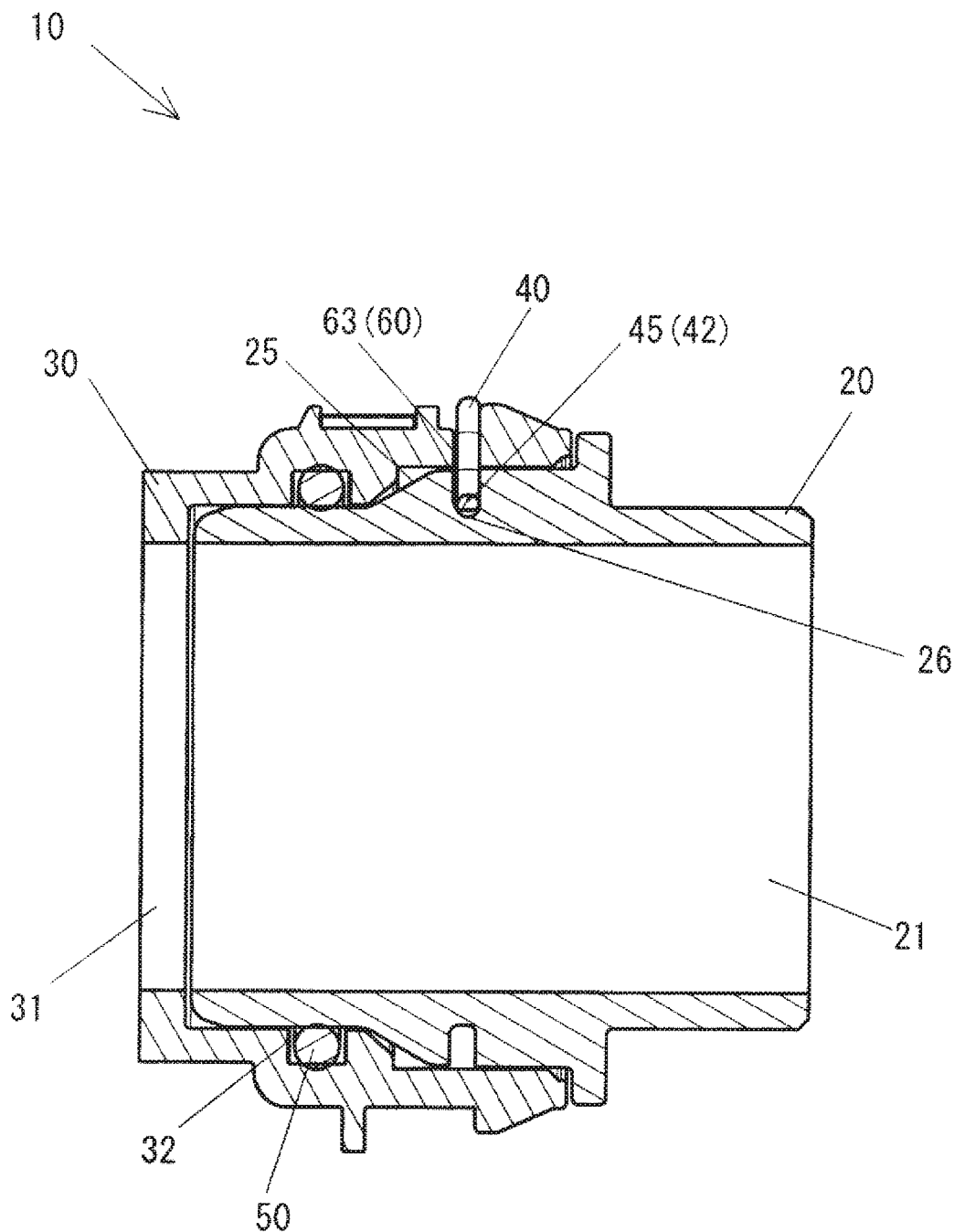
FIG. 16 is a sectional view at line B-B in FIG. 14.

As shown in FIGS. 2, 7 and 16, the engagement portion 26 locks in the opening 31 of the housing 30, the insertion portion 23 of the tubular body 20, by a curved portion 42, described below, of the locking member 40, positioned between the tapered portion 25 and the housing 30, fitting therein. The engagement portion 26 is formed into a concave shape recessed in a ring shape; the locking member 40 whose diameter is expanded by the tapered portion 25 falls in by its diameter being reduced by a restoring force of a spring.

(Housing 30)

As shown in FIGS. 1, and 2, the housing 30 is a tubular shape mounted at least at one end with the tubular body 20 equipped with the engagement portion 26. The housing 30 is integrally formed by a thermoplastic synthetic resin, for example, having rigidity.

The housing 30 includes an opening 31 that penetrates left and right, in FIG. 2; an inner diameter of the opening 31 is set to be greater than an outer diameter of the insertion portion 23 of the tubular body 20. A ring groove 32 recessed in a ring shape is disposed in the opening 31, and the O-ring 50, described below, is fitted into the ring groove 32.

Figure 3:
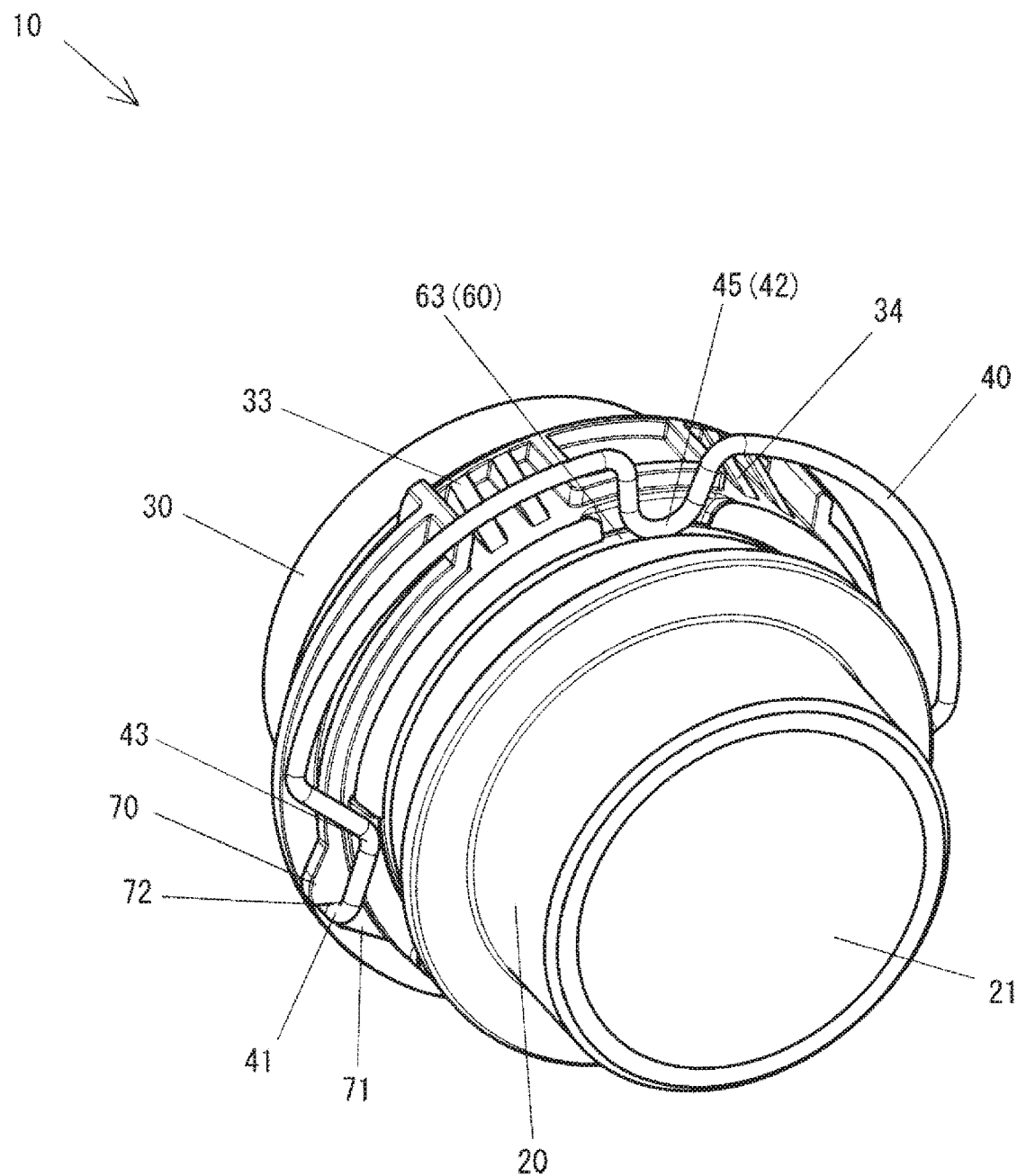
FIG. 3 is a perspective view of a housing according to the first embodiment of the present invention, locked by the locking member according to a first embodiment of the present.
Figure 4:
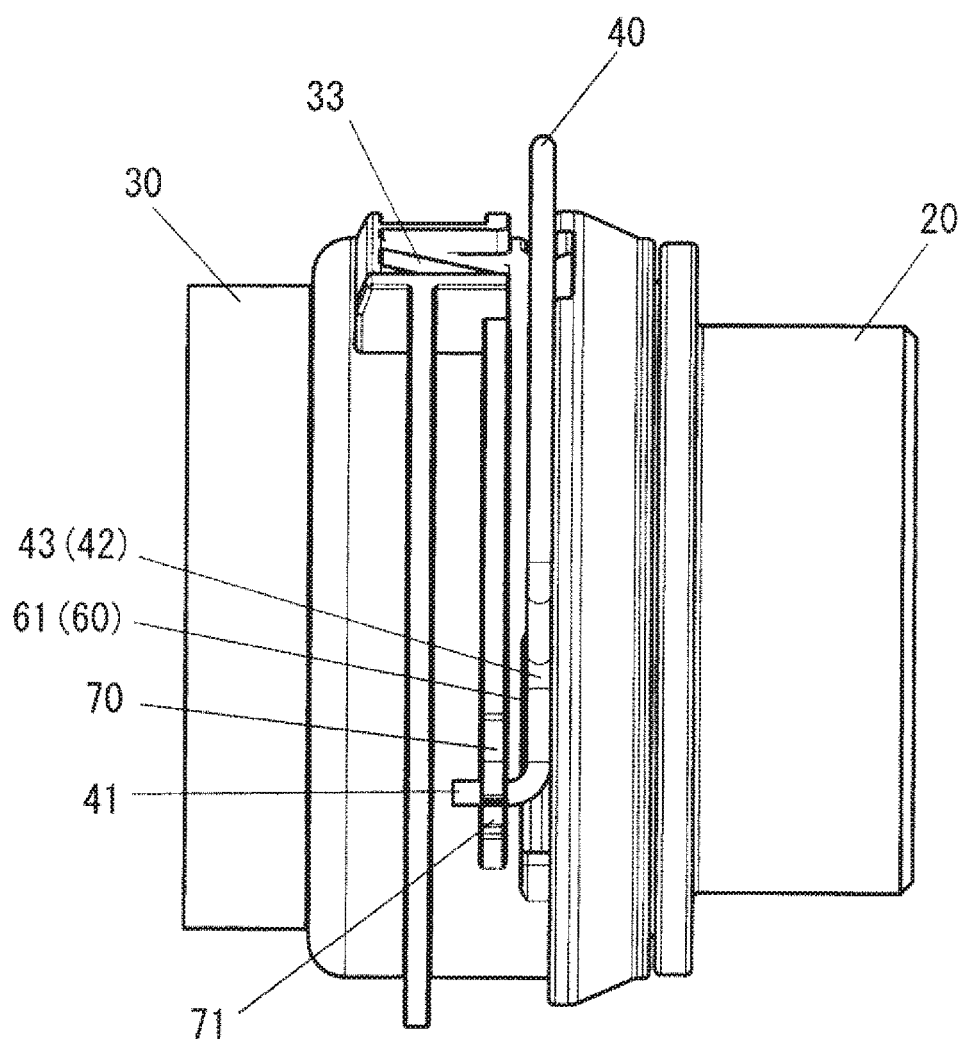
FIG. 4 is a side view of the housing, in a locked state of the locking member, corresponding to FIG. 3.
Figure 5:
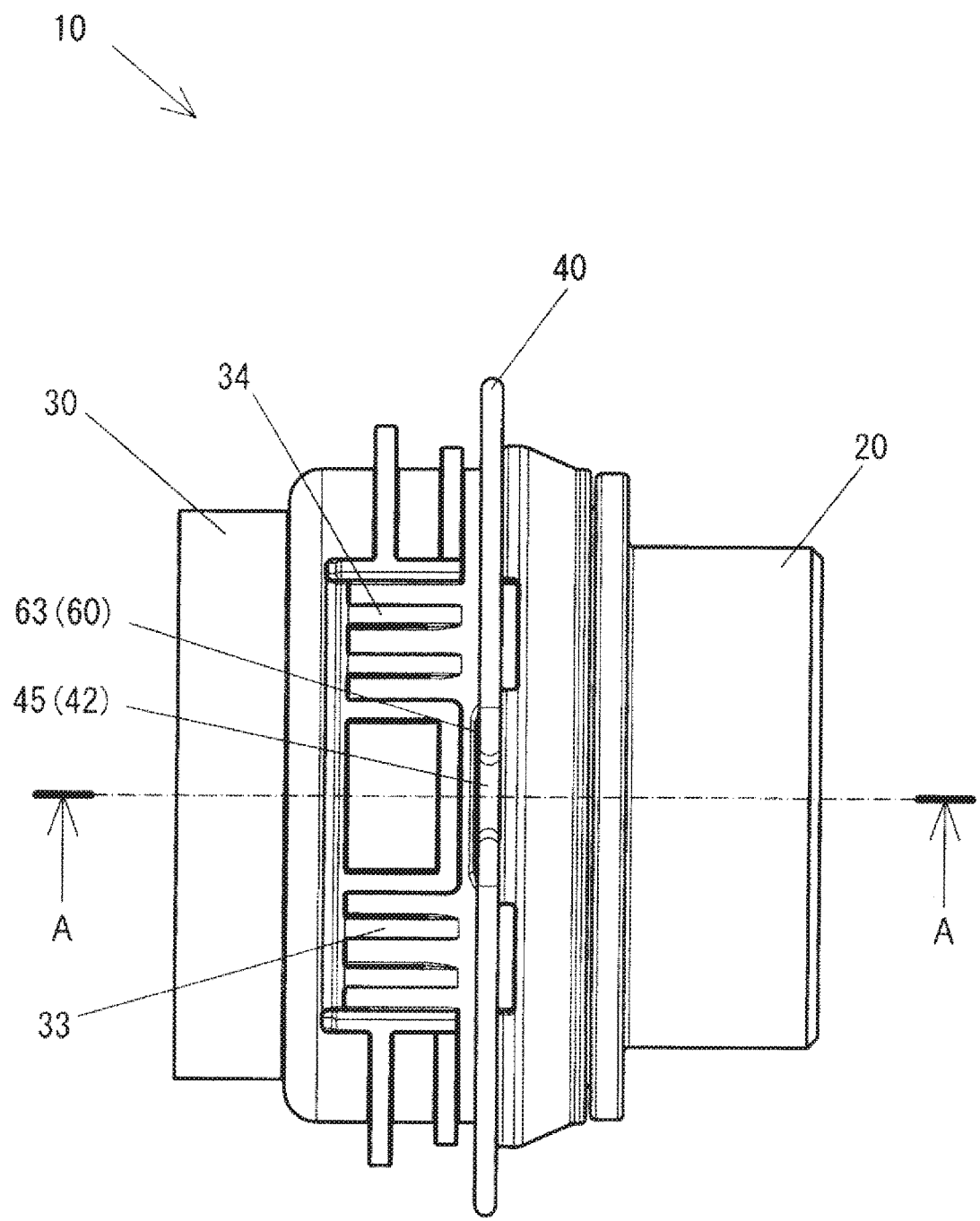
FIG. 5 is a plan view of the housing, in a locked state of the locking member, corresponding to FIG. 3.
Figure 6:
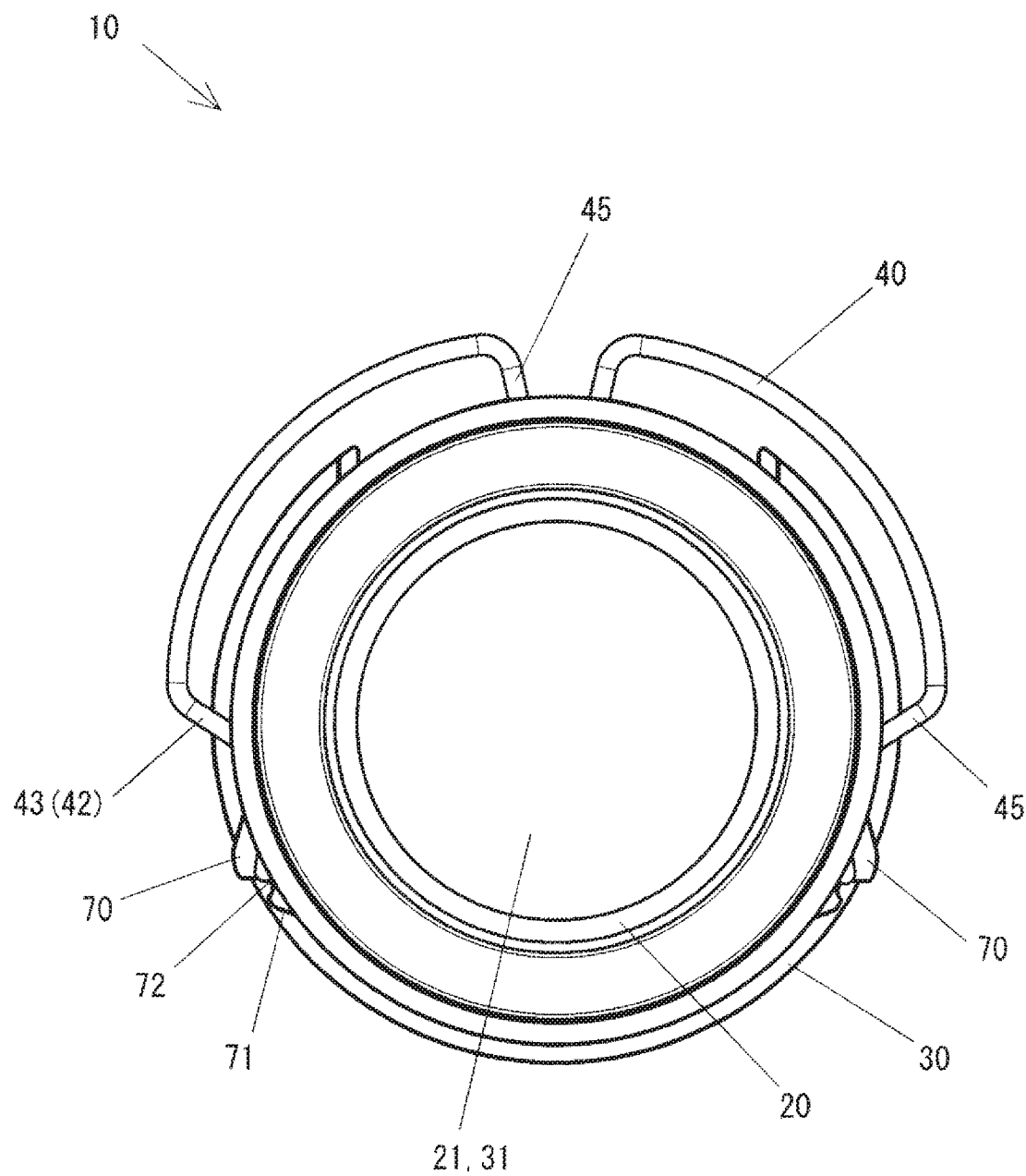
FIG. 6 is a right-side view of the housing, in a locked state of the locking member, corresponding to FIG. 3.

As shown in FIGS. 3, and 5, oblique grooves 33 and 34 for a pair of jigs are disposed at an outer circumference of the housing 30. The oblique grooves 33 and 34 for a pair of jigs are each positioned at both sides of a third slit 63 positioned at a top side of a slit 60, described below.

Each oblique groove 33, 34 for the jigs is a downward slope oblique toward the third slit 63 side; a leading-end portion of a regular screwdriver that is one example of the jig, can be inserted obliquely, although this is not shown in the drawings. The leading-end portion of the inserted regular screwdriver is inserted between the outer circumference of the housing 30 and the locking member 40. Using the principle of a lever, it is possible to raise the locking member 40 in the outer diameter direction of the housing 30, with the leading-end portion of the regular screwdriver inserted, thereby releasing the locked state of the locking member 40.

Figure 10:
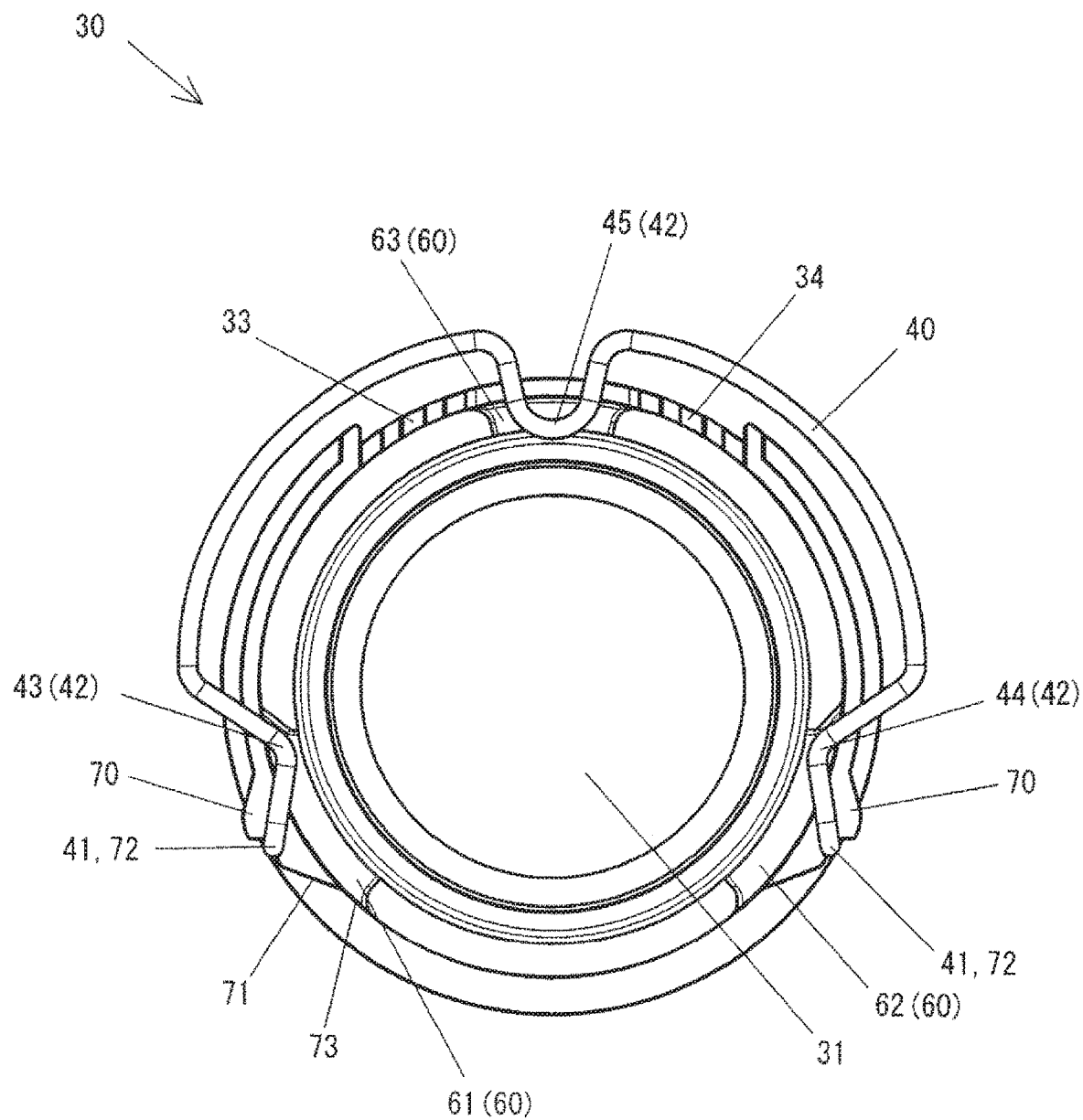
FIG. 10 is a side view with a portion of the housing cut-out, with the locking member in a lock-released state.
Figure 11:
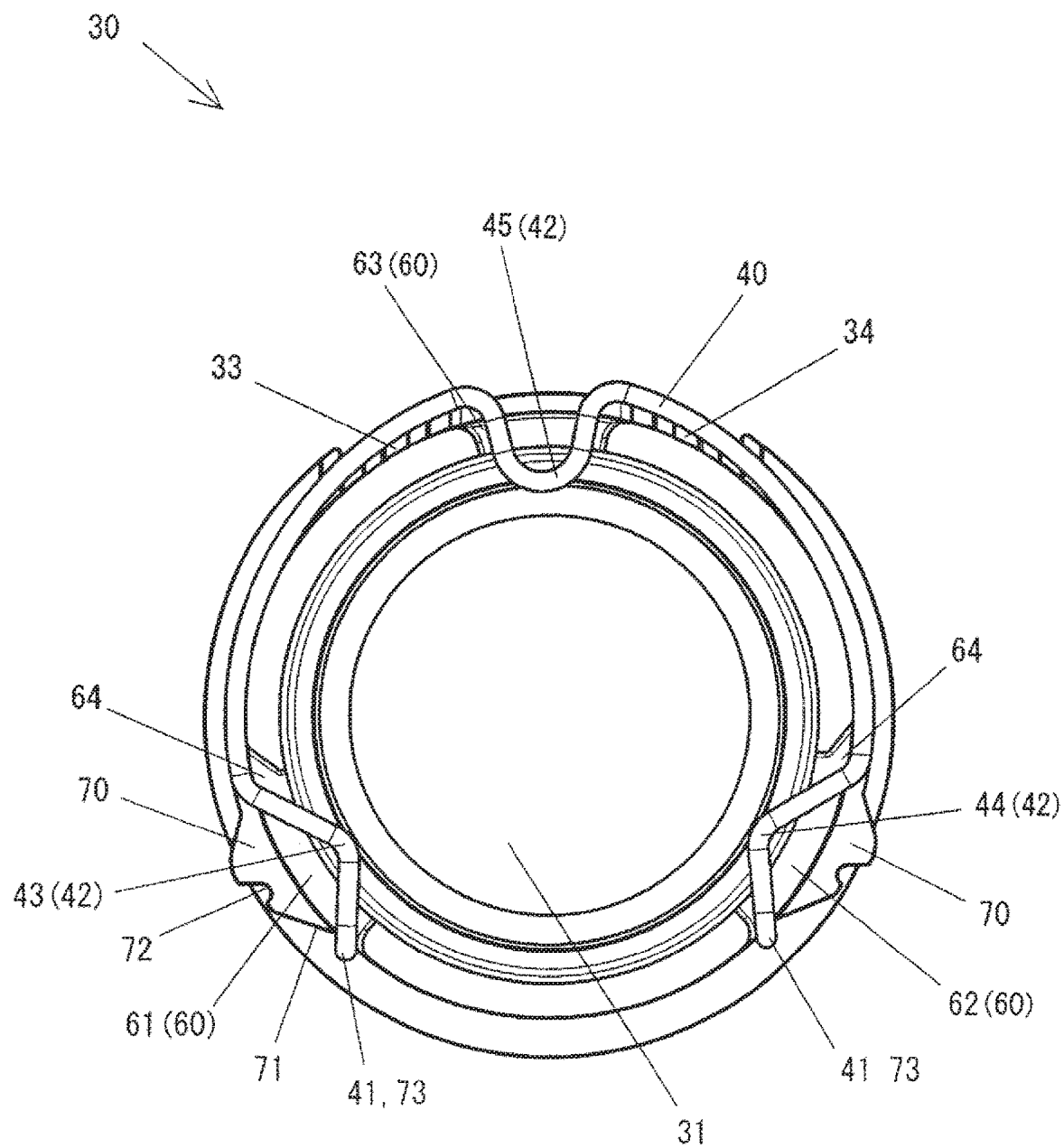
FIG. 11 is a side view with a portion of the housing cut-out, with the locking member in a locked state, corresponding to FIG. 10.
Figure 12:
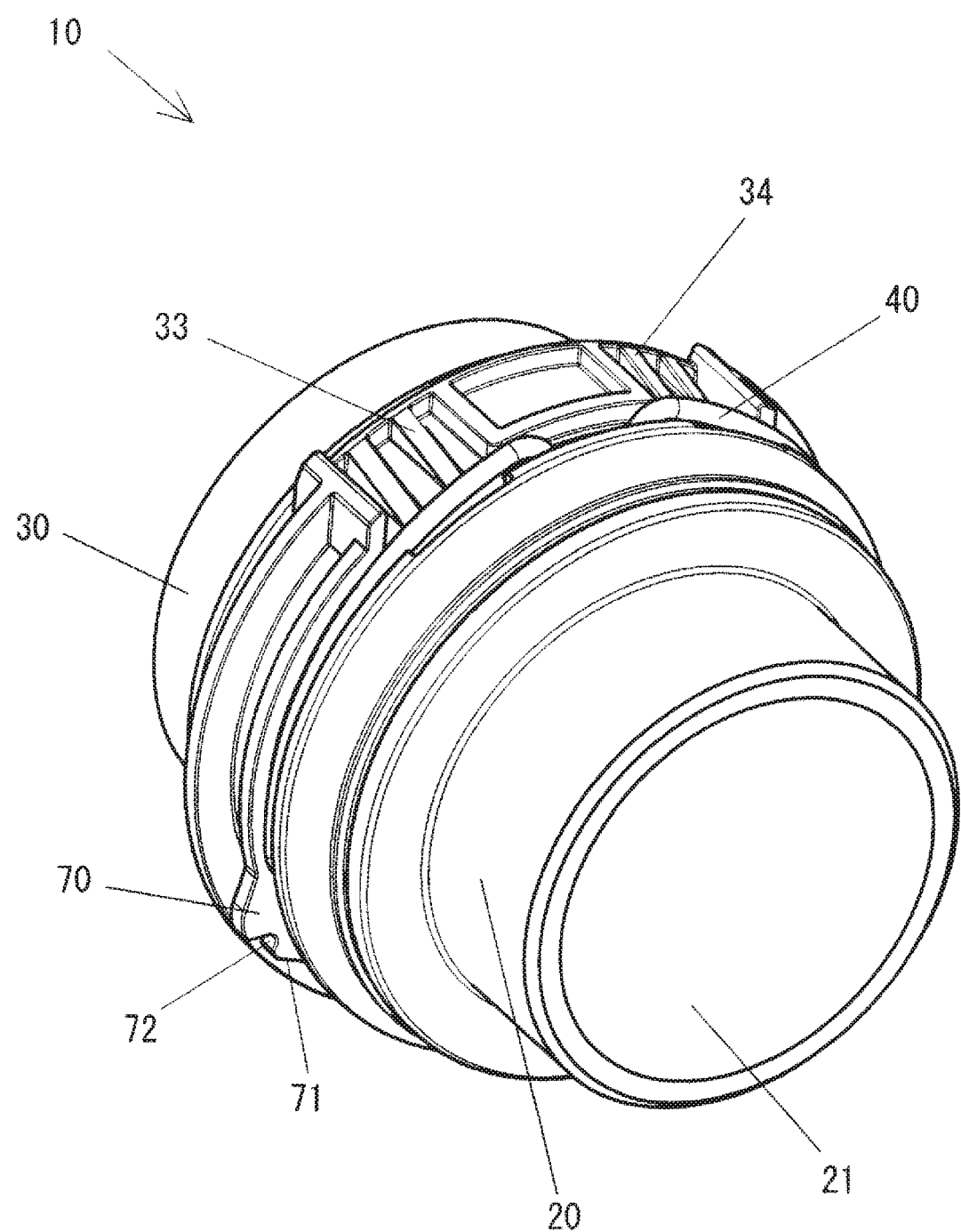
FIG. 12 is a perspective view of the housing, with the locking member in a lock-released state, corresponding to FIG. 3.
Figure 13:
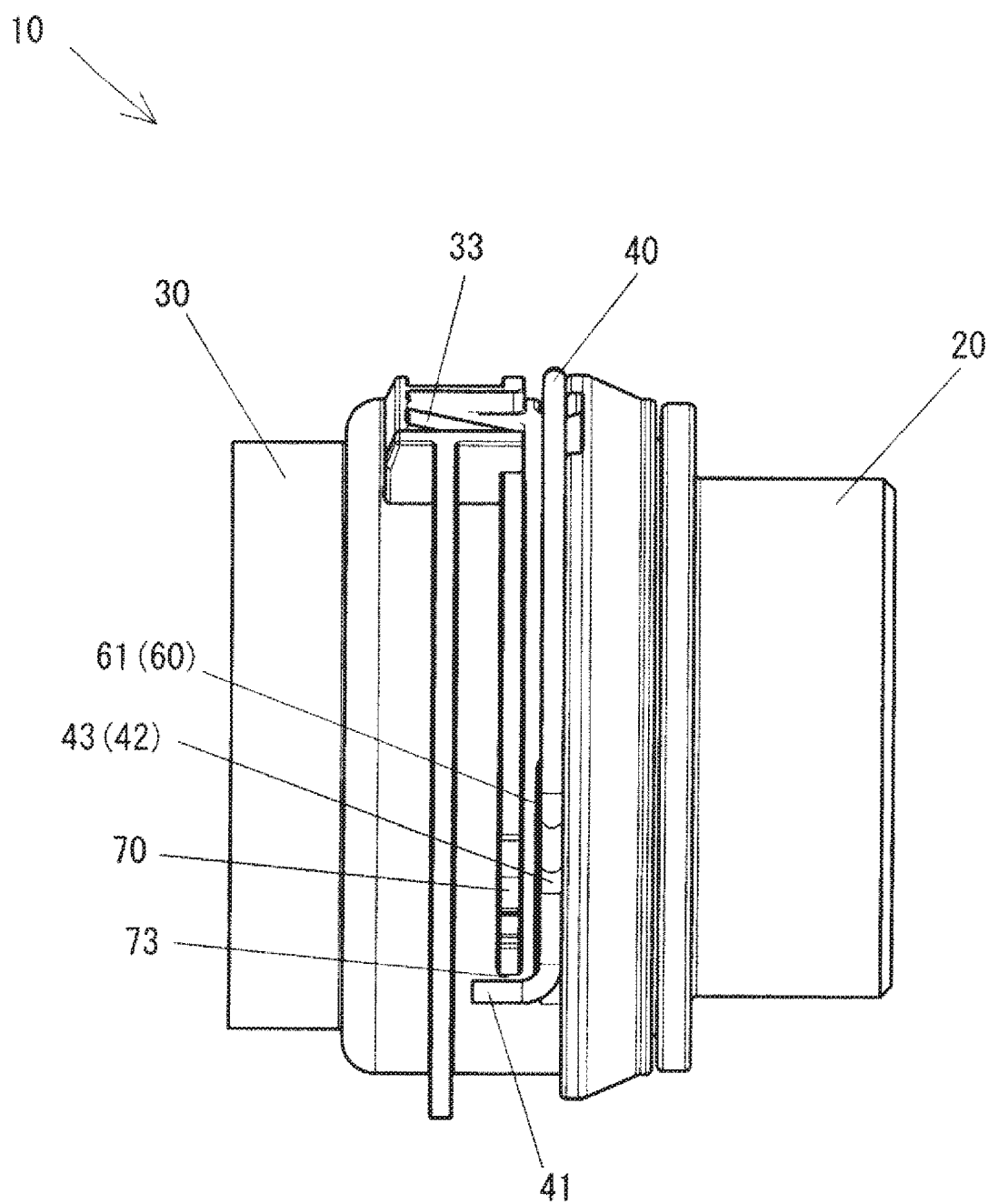
FIG. 13 is a side view of the housing, with the locking member in a lock-released state, corresponding to FIG. 4.
Figure 14:
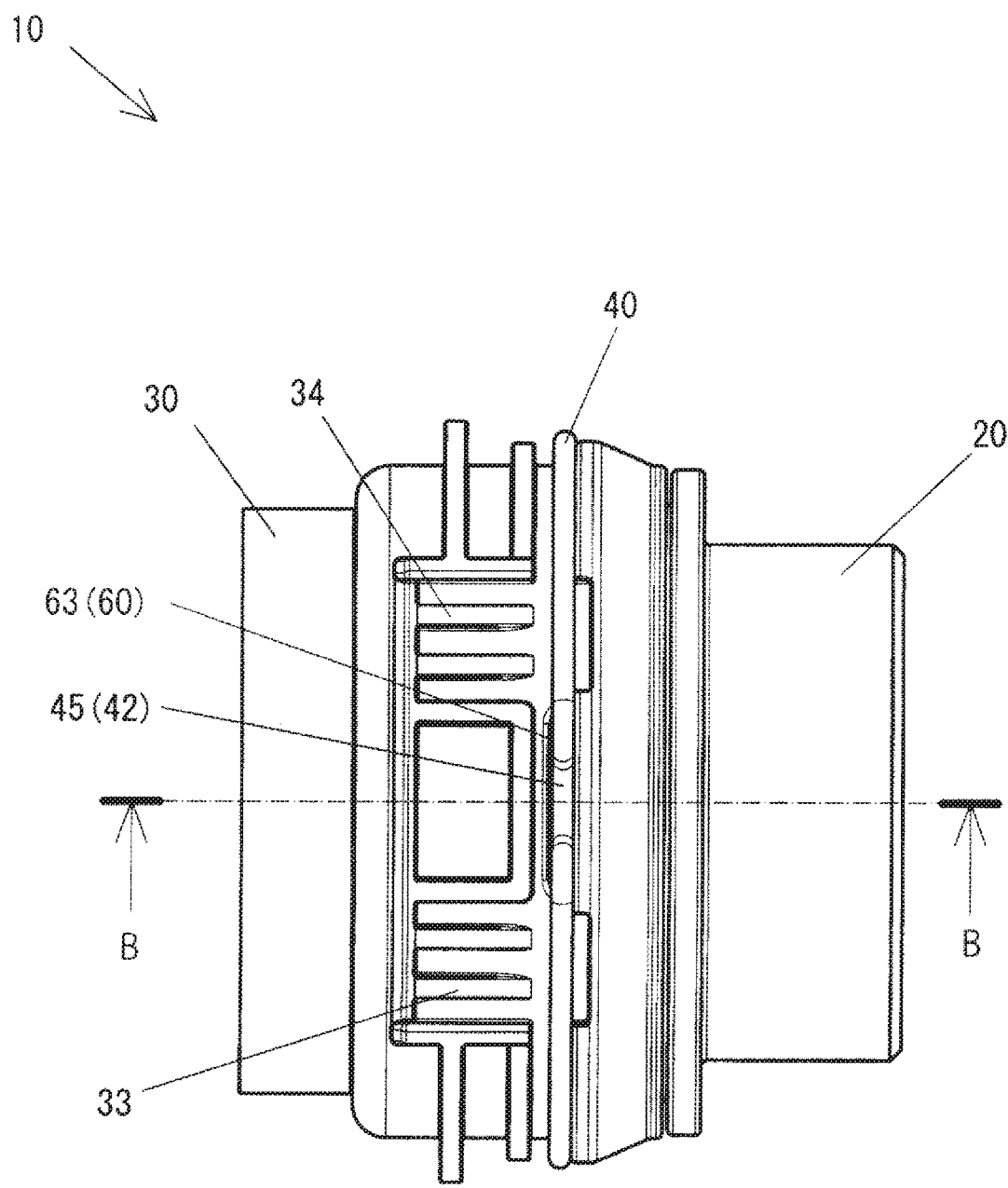
FIG. 14 is a plan view of the housing, with the locking member in a lock-released state, corresponding to FIG. 5.
Figure 15:
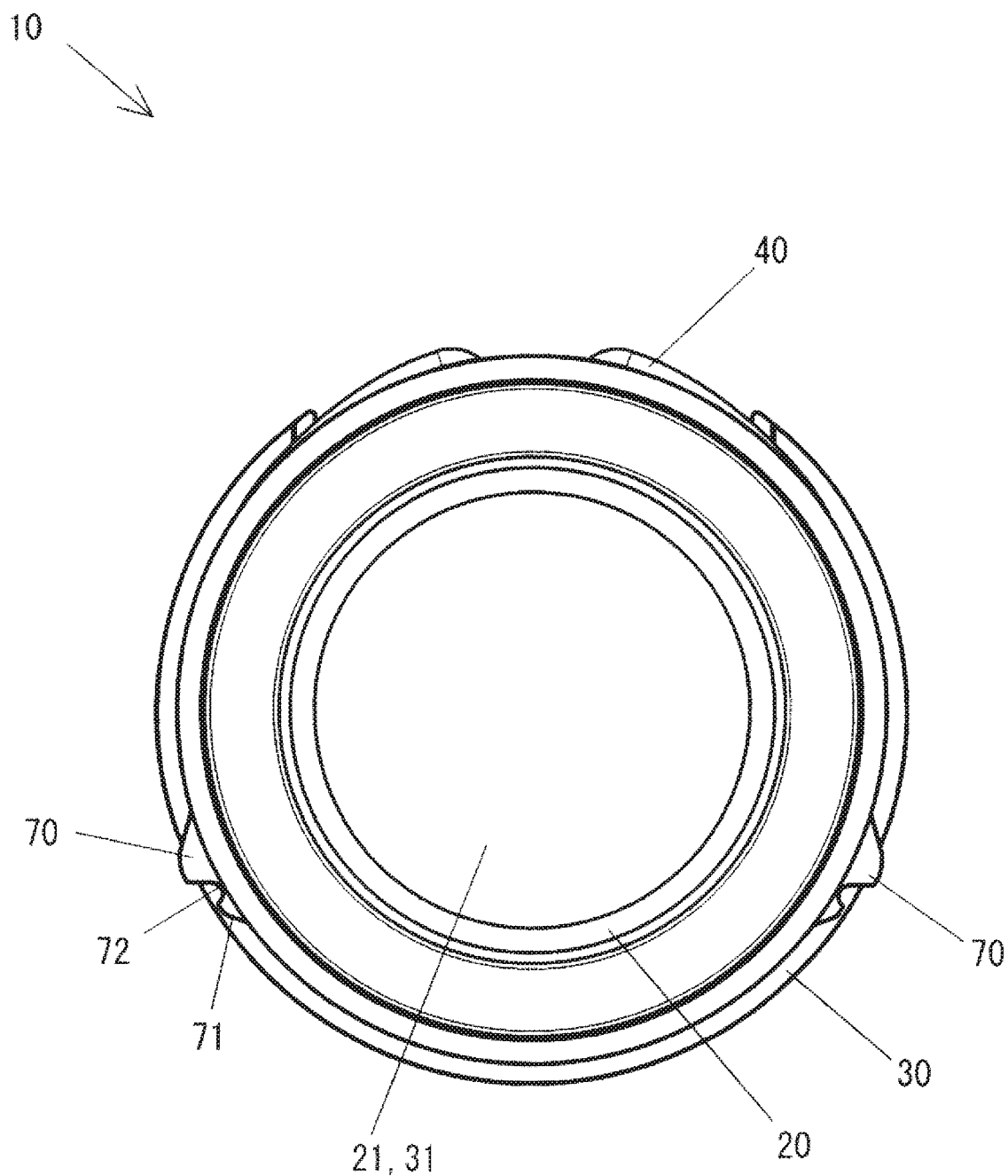
FIG. 15 is a right-side view of the housing, with the locking member in a lock-released state, corresponding to FIG. 6.

As shown in FIGS. 10, and 11, when the locking member is raised by using the oblique groove 33 for the jigs positioned at the left side when looking at the drawing, for example, of the oblique grooves 33 and 34 for the pair of jigs, the locked state of the first curved portion 43 positioned in the same direction, is released. When the locking member 40 is raised by using the oblique groove 34 positioned at right side, when looking at the drawing, the locked state of the second curved portion 44 positioned in the same direction, is released.

Also, the locked state of the entire locking member 40 is released by releasing the locked states of both of the first and second curved portions 43 and 44.

Also, the oblique grooves 33, 34 are disposed in a pair, but they are not limited thereto. A single one is also acceptable.

Conversely, as shown in FIGS. 1, and 2, each of the followings is disposed in the housing 30.

Also, the following items of (1) and (2) will be described below.

(1) Slit 60
(2) Guide unit 70

Also, each part of the housing 30 is not limited to (1) and (2) above.

(Locking Member 40)

The locking member 40 locks and unlocks the housing 30, and the tubular body 20, as shown in FIGS. 1, and 2. Also, the locking member 40 is mounted to the housing to be able to move in the outer diameter direction by the tapered portion 25 of the tubular body 20 when inserting the tubular body 20, as shown in FIG. 2, and FIGS. 8 to 11.

Specifically, the locking member 40 is composed of a metal wire, or similar wire-like material, for example, the wire being formed by bending substantially into a C shape with a bottom portion thereof open, and imparted with a property of a spring, as shown in FIGS. 8 to 11. An inner diameter of the substantially C shape, is set to be lower than the outer diameter, of the housing 30; using the spring property, the locking member 40 falls from the outside into the outer circumference of the housing 30, and tightening the outer circumference of the housing 30 with the resilient restoring force of the spring.

Also, the locking member 40 may be imparted with the spring property by bending a metal plate member, instead of using a metal wire, or similar wire-like material.

Each of the following parts is disposed in the locking member 40, as shown in FIGS. 8 to 11.

Also, the following items of (1) and (2) will be described below.

(1) Leading-end Portion 41
(2) Curved Portion 42

Also, each part of the locking member 40 is not limited to (1) and (2) above.

(O-ring 50)

As shown in FIG. 2, the O-ring 50 is fitted into the ring groove 32 that is disposed in the opening 31 of the housing 30. The O-ring 50 is made from rubber, and elastically touches an outer circumference surface of the insertion portion 23 of the tubular body 20 inserted into the opening 31, as depicted in FIGS. 7, and 16, to seal between an inner circumference surface of the opening 31 and the outer circumference surface of the insertion portion 23.

Also, one O-ring 50 is used, but a plurality of O-rings is also acceptable.

(Leading-End Portion 41)

Figure 8:
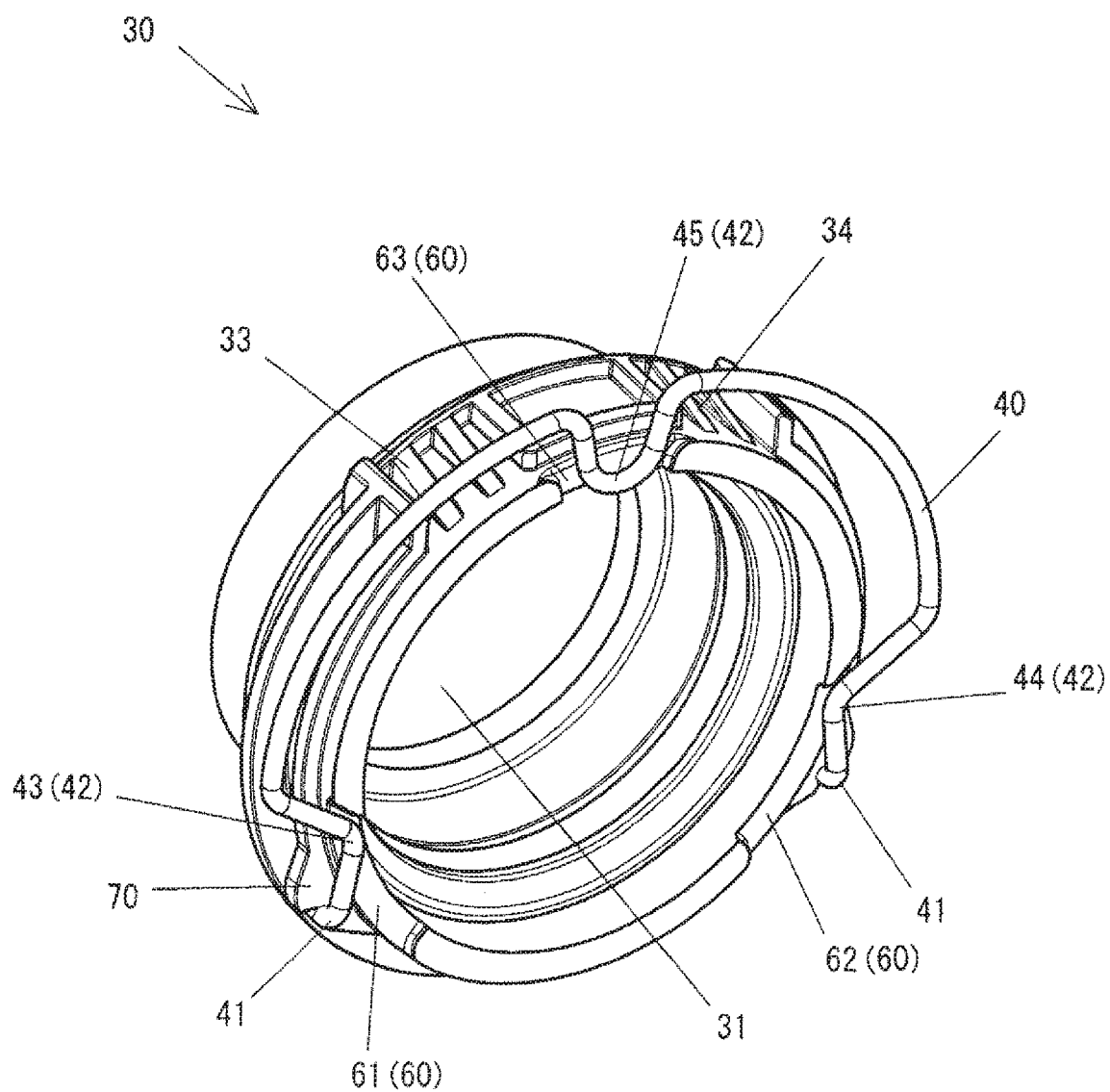
FIG. 8 is a perspective view with a portion of the housing cut-out, with the locking member in a lock-released state.
Figure 9:
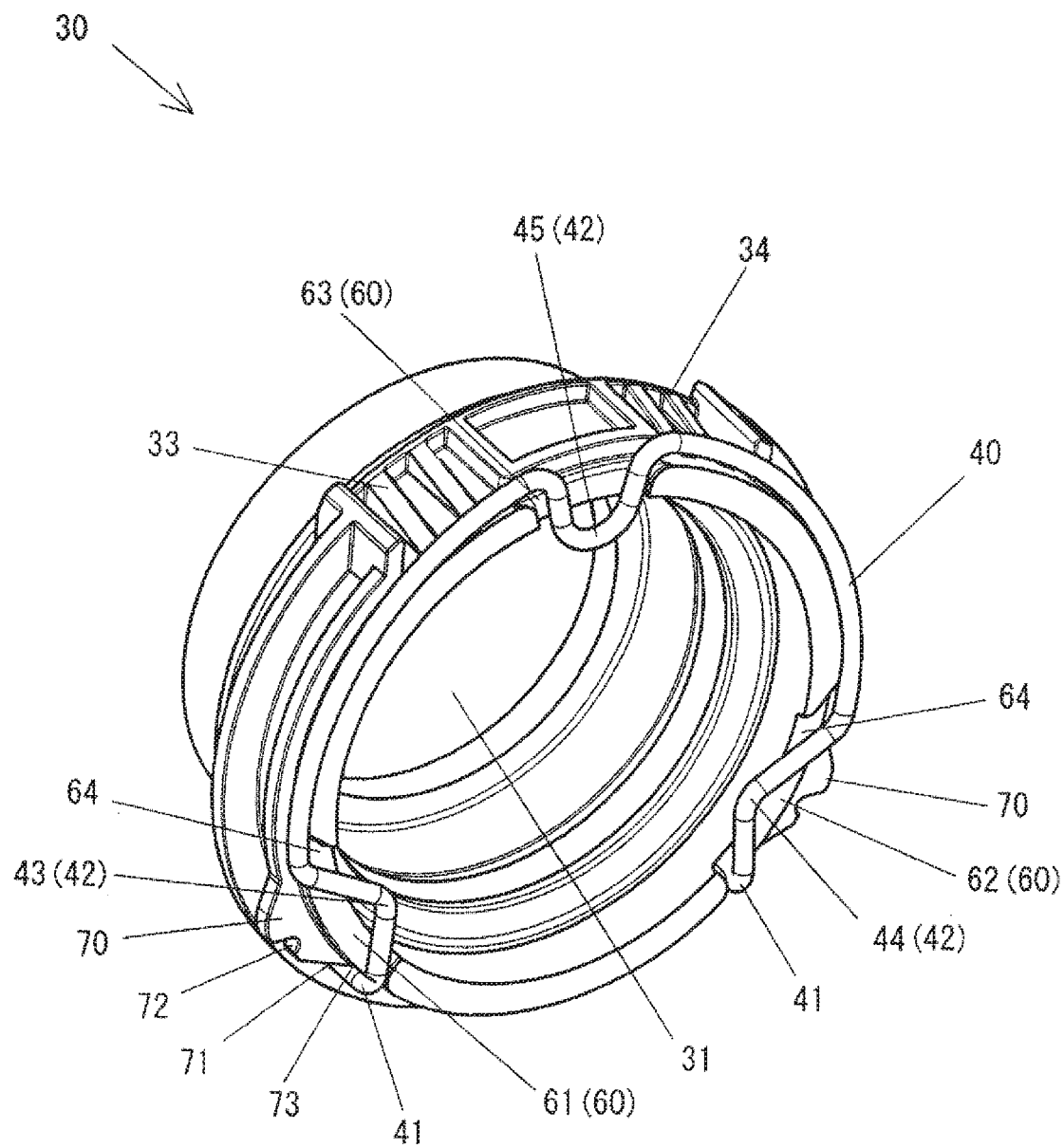
FIG. 9 is a perspective view with a portion of the housing cut-out, with the locking member in a locked state, corresponding to FIG. 8.

As shown in FIGS. 8 to 11, the leading-end portions 41 of the locking member 40 are a pair of mutually separated, free-end portions, in other words, positioned at bottom ends on the left and right, in a substantially C-shape with the bottom open. As shown in FIGS. 8, and 9, the leading-end portions 41 are bent substantially into an L shape from a circumferential direction of the housing 30 in an entire length direction, and are locked to a guide unit 70, described below, in the housing 30.

(Curved Portion 42)

The curved portion 42 of the locking member 40 is a portion bent in the inner diameter direction; a plurality of curved portions, for example three, is disposed, as shown in FIGS. 8 to 11. The curved portion 42 can project into the opening 31 of the housing 30 by passing through the slit 60, described below, penetrating inside to outside of the housing 30; when in a projected state, it is formed to lock with the engagement portion 26 of the tubular body 20, as shown in FIGS. 7 and 16.

The curved portion 42 is equipped with each of the following parts, as shown in FIGS. 8 to 11.

Also, three first to third curved portions 43 to 45 exemplify the curved portion 42, but they are not limited thereto. It is also acceptable to omit the third curved portion 45, to dispose two, or to dispose four or more.

(1) First and Second Curved Portions 43, and 44

The first and the second curved portions 43 and 44 are disposed at the leading-end side of the locking member 40, as shown in FIGS. 8 to 11, in other words at the leading-end portion 41 side, and are bent in the inner diameter direction. The first and the second curved portions 43, and 44 can project into the opening 31 of the housing 30 by passing through each of first and second slits 61 and 62, described below, penetrating inside to outside of the housing 30; when in a projected state, they are formed to lock with the engagement portion 26 of the tubular body 20.

Specifically, the first and the second curved portions 43, and 44 are bent substantially into a V shape or a chevron, and formed continuously at a top side of the leading-end portion 41; a total of two is symmetrically disposed at the left and right. Also, the first and the second curved portions 43 and 44 are bent into a substantially into a V shape or a chevron, but they are not limited thereto. They may also be bent into a general U shape.

(2) Third Curved Portion 45

The third curved portions 45 is disposed between the first and the second curved portions 43 and 44, and is bend in the inner diameter direction, as shown in FIGS. 8 to 11. The curved portion 45 can project into the opening 31 of the housing 30 by passing through the slit 63, described below, penetrating inside to outside of the housing 30; when in a projected state, it is formed to lock with the engagement portion 26 of the tubular body 20, as shown in FIGS. 7 and 16.

Specifically, the third curved portion 45 is bent substantially into a U shape; one is disposed partway between the first and the second curved portions 43 and 44, specifically, at a top side. The third curved portions 45 is bent substantially into a U shape, but it is not limited thereto. It may also be bent substantially into a V shape or a chevron.

(Slit 60)

As shown in FIGS. 8 to 11, the first to the third curved portions 43 to 45 on the locking member 40 pass through the slits 60 and are bent to lock with the engagement portion 26 of the tubular body 45 mounted to the housing 30. The slits 60 penetrate inside and outside of the groove toward the opening 31 from an outer circumference of the housing 30; a plurality is formed, for example three are formed, along a circumference direction of the housing 30.

The slits 60 are equipped with the following parts, as shown in FIGS. 8 to 11. Also, the following items (1) to (4) exemplify each part of the slits 60, but they are not limited thereto. For example, the three items of the first to third slits 61 to 63 exemplify the slits 60, but they are not limited thereto. It is also acceptable to omit the third curved portion 45 of the locking member 40 to dispose two, or to dispose four or more curved portions 42 of the locking member 40, to dispose four or more.

(1) First Slit 61

As shown in FIGS. 10, and 11, the first slit 61 is positioned at a left side when looking at the drawing, allowing the first curved portion 43 positioned in the same direction on the locking member 40 to pass therethrough.

(2) Second Slit 62

As shown in FIGS. 10, and 11, the second slit 62 is positioned at a right side when looking at the drawing, allowing the second curved portion 44 positioned in the same direction on the locking member 40 to pass therethrough.

(3) Third Slit 63

As shown in FIGS. 10 and 11, the third slit 63 is positioned at a center at a top; this allows the third curved portion 45 positioned partway along a length of the locking member 40, in other words, in the center, to pass therethrough.

(4) Gap 64

As shown in FIGS. 9 and 11, the gaps 64 are positioned between the curved portion 42 of the locking member 40 (the first and the second curved portions 43, and 44 on the left and right), and an end portion (top-side end) of the slit 60 (first and second slits 61 and 62) positioned at the leading-end side of the locking member 40, in other words positioned at an opposite direction side to the leading-end portion 41 side, and are set not to touch while at least the locking member 40 is moving.

Specifically, using one side as an example for the description, the gap 64 is formed to extend the top end portion of the first slit 61 toward a top in the circumference direction of the housing 30.

As shown in FIGS. 9 and 11, when it moves from a state in which the first curved portion 43 of the locking member 40 reduces its diameter in the inner diameter direction and projects into the opening 31 of the housing 30 passing through the first slit 61 to a state in which the diameter is expanded in the outer diameter direction, it moves in the gap 64 and does not touch an edge at a top-end portion of the first slit 61.

For that reason, compared to the diameter being expanded in the outer diameter direction while touching the edge of the top-end portion of the first slit 61, it is possible to eliminate frictional resistance and to reduce the operating force for expanding the diameter of the locking member 40.

(Guide 70)

As shown in FIGS. 8 to 11, the guide 70 widens that curved portion 42, in other words the first and the third curved portions 43 and 44, when the locking member 40 is moved in the outer diameter direction, at least when releasing the lock.

A total of two guides 70 is disposed at a bottom side, a leading-end side of the locking member more than the end portion of the slit 60, in other words the first and the second slits 61 and 62, in other words the leading-end portion 41, specifically the circumference direction of the housing 30.

Each guide 70 locks with the leading-end portion 41 bent substantially into an L shape on the locking member 40, as shown in FIGS. 8 to 11; when the locking member 40 expands or reduces its diameter, they extend along a trajectory of the leading-end portion 41, specifically, in the circumference direction of the housing 30. Each guide 70 projects from the outer circumference of the housing 30, wherein side surfaces are formed into two large and small bumps.

Each guide 70 is equipped with each of the following parts, as shown in FIGS. 17(*a*) to 18(*c*). Also, each part of the guide 70 is not limited to the following parts (1) and (3).

(1) Oblique Sliding Surface 71

As shown in FIGS. 17(*a*)-17(*c*), the oblique sliding surface extends from the outer surface of the housing 30 that enables the leading-end portion 41 of the locking member 40 to slide toward the outside in the diameter direction, when the locking member 40 moves to the outer diameter direction to the housing 30, or when moving from a position after moving to the outer diameter direction, to the inner diameter direction, as shown in FIG. 18. The oblique sliding surface 71 is composed of an oblique surface leading to the small bump, of the two large and small bumps.

(2) Holding Portion 72

As shown in FIG. 17, the holding portion 72 is disposed at the oblique sliding surface 71 after the leading-end portion 41 of the locking member 40 moves, and holds the leading-end portion 41. The holding portion 72 is formed into a concave shape between the two large and small bumps, and sandwiches the leading-end portion 41 of the locking member 40.

(3) Run-Up Portion 73

The run-up portion 73 is set so that the oblique sliding surface 71 touches the leading-end portion 41 of the locking member 40 from partway in the movement when the locking member 40 moves in the outer diameter direction to the housing 30, as shown in FIGS. 17(*a*)-17(*c*). The run-up portion 73 is curved along the outer circumference surface of the housing 30, and is a part that leads to the oblique sliding surface 71.

(Method for Connecting the Tubular Body 20 to the Housing 30)

Next, a method for connecting the tubular body 20 to the housing 30 will now be described.

As shown in FIGS. 1, and 2, the locking member 40 is fitted onto the outer circumference of the housing 30; the first to the third curved portions 43 to 45 each pass through the first to the third slits 61 to 63 in the housing 30, and project into the opening 31 of the housing 30.

As shown in FIGS. 3 to 7, the tubular body 20 can be connected to the housing 30 by inserting the insertion portion 23 in line with the opening 31 of the housing 30.

In other words, when the insertion portion 23 is inserted, the tapered portion 25 thereof touches the first to the third curved portions 43 to 45 projecting inside the opening 31.

Figure 17A:
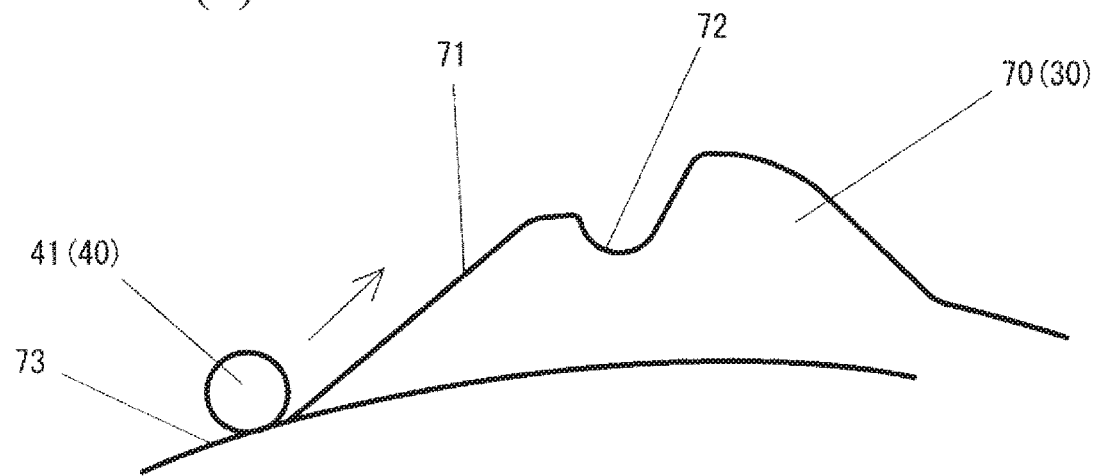

For that reason, the first to the third curved portions 43 to 45 are pushed by the tapered portion 25, so the locking member 40 expands in diameter in the outer diameter direction. At that time, the leading-end portion 41 of the locking member 40 slidingly moves while touching the run-up portion 73 on the housing 30, as shown in FIG. 17(a). Conversely, it is acceptable to move with the run-up portion 73 in a raised state, without sliding.

Figure 17B:
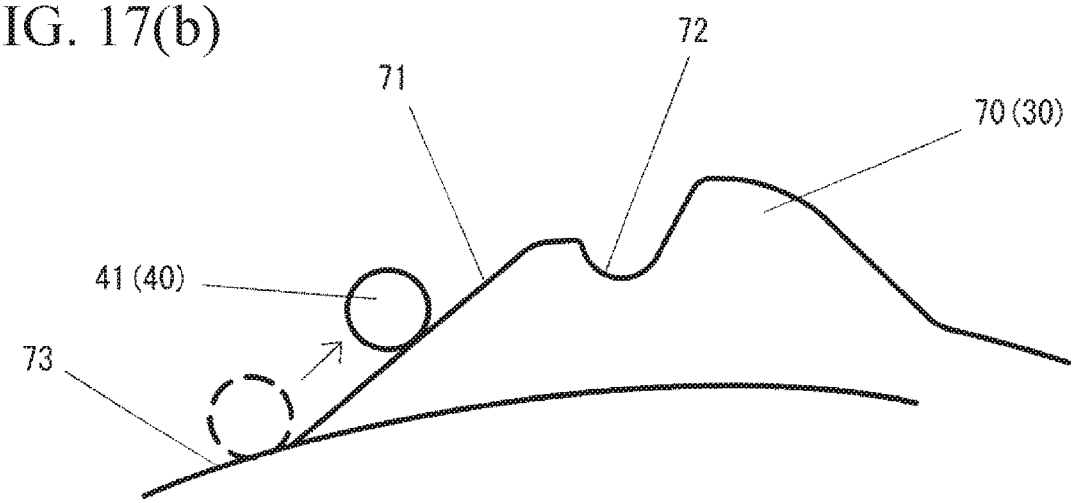

When the locking member 40 further widens in diameter in the outer diameter direction, the leading-end portion 41 of the locking member 40 reaching from the run-up portion 73 of the guide unit 70 to the oblique sliding surface 71, slides while touching the oblique sliding surface 71 and climbs the oblique sliding surface 71, as shown in FIG. 17(b).

Conversely, the first to the third curved portions 43 to 45 overcome the tapered portion 25 and fall into the concave shaped engagement portion 26. At that time, the locking member 40 is reduced in diameter in the inner diameter direction by the restoring force of the spring, and the first to the third curved portions 43 to 45 fall into the engagement portion 26; the insertion portion 23 of the tubular body 20 will not come out from in the opening 31 in the housing 30, and is locked in the connected state.

When the locking member 40 is reduced in diameter, it is rapidly reduced in diameter in the inner diameter direction by the restoring force of the spring, so after instantaneously being raised from the oblique sliding surface 71 of the housing 30, the leading-end portion 41 lands by touching the oblique sliding portion 71, and slidingly moves while touching the oblique sliding surface 71. Thereafter, the leading-end portion 41 of the locking member 40 slides down the oblique sliding surface 71 and reaches the run-up portion 73, slidingly moving while touching the run-up portion 73.

(Method for Releasing the Connected State of the Tubular Body 20)

A method for removing the tubular body 20 in the connected state will now be described below.

Although not shown in the drawings, insert a regular screwdriver, an example of a jig, into the oblique grooves 33 and 34 for the pair of jigs in the housing 30, and use the principle of a lever to cause the locking member 40 to rise in the outer diameter direction of the housing 30, in other words as shown in FIGS. 8 and 10, thereby releasing the locked state.

Figure 17C:
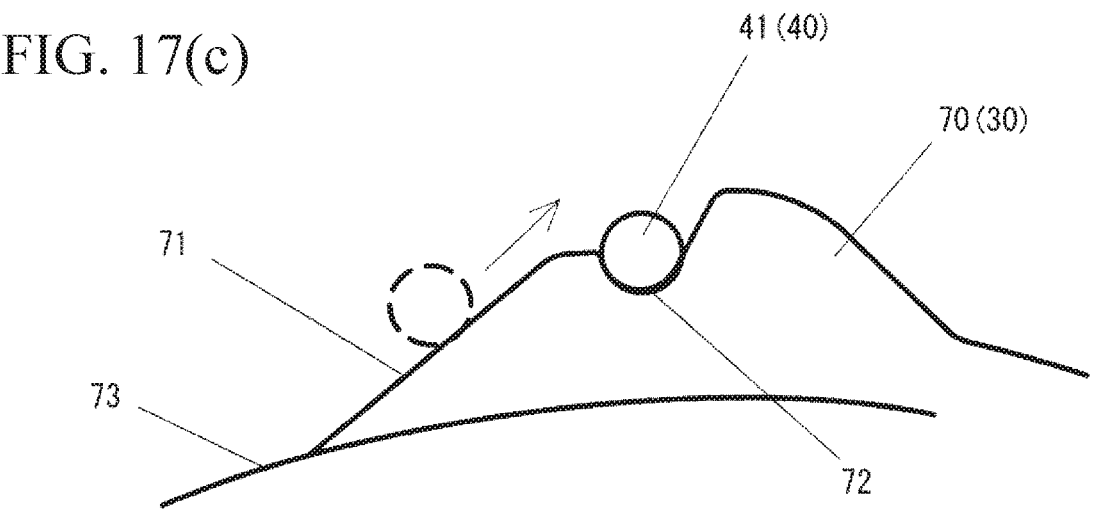

Specifically, when the locking member 40 is raised, the leading-end portion 41 reaches the oblique sliding surface 71 from the run-up portion 73 on the guide 70, as depicted in FIGS. 17(a) and 17(b), slides while touching the oblique sliding surface 71 and climbs the oblique sliding surface 71. Then, by further raising the locking member 40, the leading-end portion 41 overcomes the oblique sliding surface 71, as shown in FIG. 17(c), and falls into the concave shaped holding portion 72. At that time, the locking member 40 is reduced in diameter in the inner diameter direction by the restoring force of the spring, the leading-end portion 41 of the locking member 40 falls into the holding portion 72, and the locking member 40 becomes locked by the guide 70.

Conversely, because the guide 70 overhangs in the outer diameter direction of the housing 30, the locking member 40 expands in diameter by leading-end portion 41 of the locking member 40 slidingly moving while touching the oblique sliding surface 71. For that reason, the first to third curved portions 43 to 45 rise up from the engagement portion 26 of the tubular body 20, and the locked state between the tubular body 20 and the housing 30 is released.

At that time, the first and second curved portions 43 and 44 move in the gap 64 of the first and the second slits 61 and 62, thereby eliminating frictional resistance, and reducing the operating force to expand the diameter of the locking member 40.

Furthermore, the first to the third curved portions 43 to 45 of the locking member 40 rise from the engagement portion 26 of the tubular body 20, so it is possible to remove the insertion portion 23 of the tubular body 20 from the opening 31 of the housing 30.

Again, when connecting the tubular body 20, it is acceptable if the central portion of the raised locking member 40 is pushed downward, thereby lowering the locking member 40, as shown in FIGS. 7, and 10.

Figure 18A:
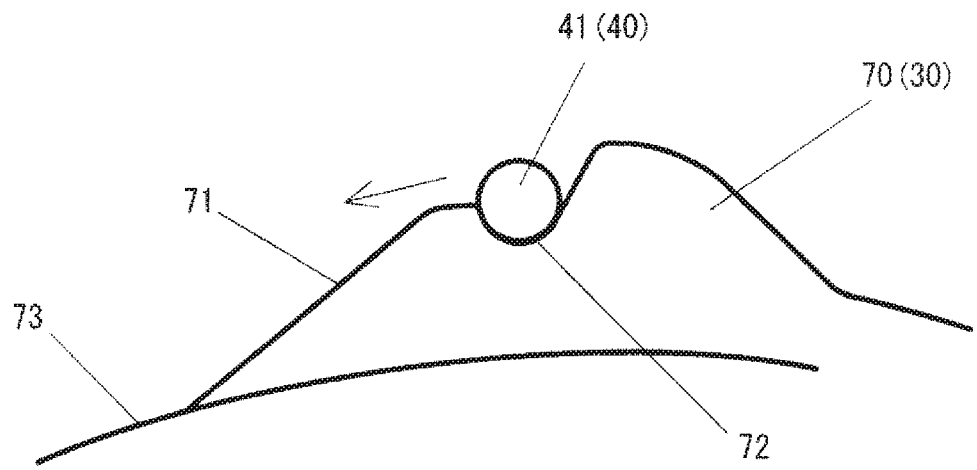
Figure 18B:
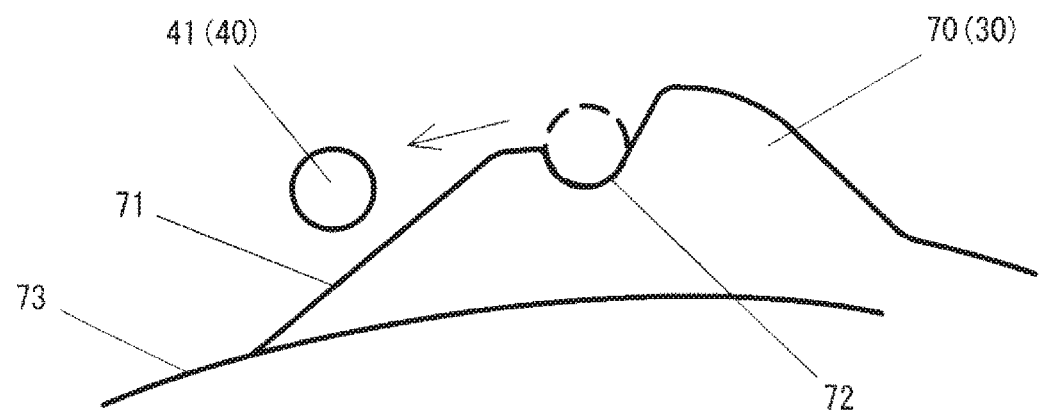
Figure 18C:
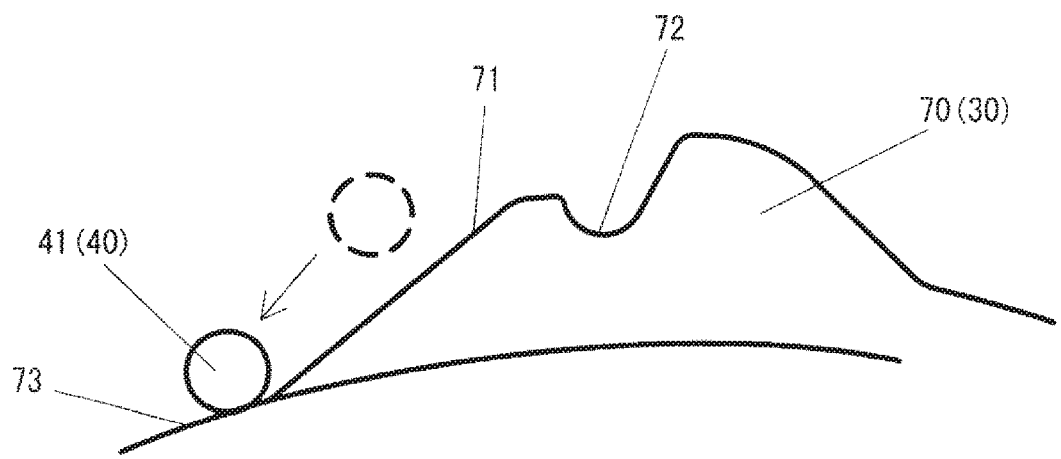

When the locking member 40 is lowered, the leading-end portion 41 is removed from the holding portion 72, as shown in FIG. 18(a)-18(c), and the locked state of the locking member 40 is released by the guide 70.

In other words, when the locking member 40 is lowered, the leading-end portion 41 thereof overcomes the ridge between the holding portion 72 and the oblique sliding surface 71, as shown in FIG. 18(a), so the locking member 40 diameter expands once in the outer diameter direction at that time.

When the leading-end portion 41 of the locking member 40 overcomes the holding portion 72, the locking member 40 rapidly reduces in diameter in the inner diameter direction by the restoring force of the spring. For that reason, after the leading-end portion 41 of the locking member 40 instantaneously rises from the oblique sliding surface 71, as shown in FIG. 18(b), it lands by touching the oblique sliding surface 71 and slidingly moves while touching the oblique sliding surface 71.

Thereafter, the locking member 40 diameter is reduced gradually in the inner diameter direction; the leading-end portion 41 thereof slides down the oblique sliding surface 71, as shown in FIGS. 18(b) and 18(c), reaches the run-up portion 73 and slidingly moves while touching the run-up portion 73.

The locking member 40 diameter is reduced in the inner diameter direction, so the first to the third curved portions 43 to 45 each pass through the first to the third slits 61 to 63 in the housing 30, and again, project into the opening 31 in the housing 30 to return to connect the tubular body 20 in a connectable state, as shown in FIGS. 9, and 11.

EXPLANATION OF LETTERS OR NUMERALS

| | |
|---|---|
| 10 Locking mechanism | 20 Tubular body |
| 21 Hollow portion | 22 Flange |
| 23 Insertion portion | 24 Connection portion |
| 25 Tapered portion | 26 Engagement portion |
| 30 Housing | 31 Opening |
| 32 Ring groove | |
| 33, 34 Oblique groove for jig | |

-continued

| | |
|---|---|
| 40 Locking member | 41 Leading-end portion |
| 42 Curved portion | 43 First curved portion |
| 44 Second curved portion | |
| 45 Third curved portion | |
| 50 O-ring | 60 Slit |
| 61 First slit | 62 Second slit |
| 63 Third slit | 64 Gap |
| 70 Guide unit | 71 Oblique sliding surface |
| 72 Holding portion | 73 Run-up portion |

The entire content of the specifications, scope of patent claims, drawings and abstract of Japanese patent application No. 2016-101191 filed May 20, 2016 is incorporated herein as a disclosure of the specifications of the present invention.

What is claimed is:

1. A locking mechanism for a tubular body with an engagement portion, comprising:
    a tubular housing having a slit, and configured to mount the tubular body on at least one end of the tubular housing, and
    a locking member that locks and releases the housing and the tubular body,
    wherein the locking member is mounted on the housing to be able to move in an outer diameter direction by a tapered portion of the tubular body when the tubular body is inserted, and includes a leading end portion bent in an axial direction of the housing, and a curved portion bent in an inner diameter direction disposed at a leading-end side of the locking member and passing the slit to lock with the engagement portion of the tubular body inserted into the housing; and
    the housing includes a guide unit for widening the curved portion toward an outside when the locking member is moved to the outer diameter direction, the guide unit protruding outwardly perpendicular to the axial direction from an outer surface of the housing to extend along the outer surface and having two bumps spaced apart from each other along the outer surface with a holding portion therebetween and an oblique sliding surface that extends from the holding portion downwardly along the outer surface of the housing so that when the leading end portion of the locking member engages the holding portion, the curved portion does not project inwardly from the tubular housing through the slit, and when the leading end portion comes out from the holding portion, the leading end portion slides downwardly along the oblique sliding surface to allow the curved portion project inwardly from the slit.

2. The locking mechanism for a tubular body according to claim 1, wherein the curved portion includes a first curved portion and a second curved portion disposed at opposing positions, and a third curved portion disposed between the first curved portion and the second curved portion.

3. The locking mechanism for a tubular body according to claim 1, wherein the leading-end portion of the locking member located in the holding portion slides outwardly when the locking member is pushed.

4. The locking mechanism for a tubular body according to claim 3, wherein the guide unit further includes a run-up portion curved along the outer circumference surface of the housing and leading to the oblique sliding surface.

5. The locking mechanism for a tubular body according to claim 1, further comprising a gap disposed between the curved portion and an end portion of the slit positioned at a side opposite to the leading-end side of the locking member so as not to contact the locking member.

6. The locking mechanism for a tubular body according to claim 1, wherein the oblique sliding surface gradually reduces a height from one of the bumps where the holding portion is positioned to the outer surface of the housing.

7. The locking mechanism for a tubular body according to claim 6, wherein another of the two bumps includes another oblique surface extending from the outer surface of the housing to the another of the two bumps.

\* \* \* \* \*